(12) United States Patent
Umezawa et al.

(10) Patent No.: US 7,452,463 B2
(45) Date of Patent: Nov. 18, 2008

(54) APPARATUS FOR TREATING WATER

(75) Inventors: Hiroyuki Umezawa, Ota (JP); Masahiro Iseki, Kumagaya (JP); Daizo Takaoka, Ota (JP); Motoyuki Tsuihiji, Ota (JP); Takashi Igarashi, Ojiya (JP); Hiromichi Ohtake, Ojiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 236 days.

(21) Appl. No.: 11/137,708

(22) Filed: May 26, 2005

(65) Prior Publication Data
US 2005/0269271 A1 Dec. 8, 2005

(30) Foreign Application Priority Data
Jun. 1, 2004 (JP) ............................. 2004-162683

(51) Int. Cl.
*C02F 1/58* (2006.01)
*C02F 101/14* (2006.01)

(52) U.S. Cl. ................. 210/195.1; 210/196; 210/199; 210/206; 210/257.1; 210/262; 210/409

(58) Field of Classification Search ................ 210/915
See application file for complete search history.

(56) References Cited

U.S. PATENT DOCUMENTS

| | | | | |
|---|---|---|---|---|
| 3,638,793 | A * | 2/1972 | Peck | 210/805 |
| 3,735,872 | A | 5/1973 | Anderson | |
| 4,414,185 | A | 11/1983 | Harrison | |
| 5,114,576 | A * | 5/1992 | Ditzler et al. | 210/195.1 |
| 5,269,934 | A | 12/1993 | Dubrovsky et al. | |
| 5,322,623 | A * | 6/1994 | Benskin et al. | 210/195.1 |
| 5,443,741 | A * | 8/1995 | Stott et al. | 210/726 |
| 6,267,892 | B1 * | 7/2001 | Wada et al. | 210/713 |
| 6,299,513 | B1 | 10/2001 | Tsuihiji et al. | |
| 6,331,256 | B1 * | 12/2001 | Kezuka et al. | 210/712 |
| 6,344,142 | B1 * | 2/2002 | Yamasaki et al. | 210/614 |

(Continued)

FOREIGN PATENT DOCUMENTS

EP 1 055 445 A2 11/2000

(Continued)

OTHER PUBLICATIONS

Korean Office Action dated Aug. 14, 2006, directed to counterpart KR application No. 10-2005-46154.

(Continued)

*Primary Examiner*—Peter A. Hruskoci
(74) *Attorney, Agent, or Firm*—Morrison & Foerster LLP

(57) ABSTRACT

Provided are a treatment apparatus for removing fluorine content from water to be treated and a method of treating water to be treated using the same. Water to be treated, containing fluorine, is introduced into a treatment tank over a first path. Slaked lime is added to the water to be treated over a second path. Calcium chloride is added to the water to be treated over a third path. Thus, the fluorine contained in the water to be treated combines with calcium forming slaked lime or calcium chloride, thus yielding calcium fluoride, which is immobilized. When a filter film immersed in the water to be treated is used for filtration, the calcium fluoride contained in the water to be treated is concentrated.

5 Claims, 12 Drawing Sheets

U.S. PATENT DOCUMENTS

| | | | |
|---|---|---|---|
| 6,454,949 B1 * | 9/2002 | Sesay et al. | 210/709 |
| 6,464,883 B2 | 10/2002 | So | |
| 6,613,230 B2 * | 9/2003 | Krulik et al. | 210/638 |
| 6,645,385 B2 * | 11/2003 | Krulik et al. | 210/709 |
| 6,652,758 B2 * | 11/2003 | Krulik | 210/721 |
| 7,157,012 B2 * | 1/2007 | Umezawa et al. | 210/748 |
| 7,182,873 B2 * | 2/2007 | Hsien et al. | 210/709 |
| 7,396,458 B2 * | 7/2008 | Umezawa et al. | 210/195.2 |
| 2003/0089647 A1 | 5/2003 | Tsuihiji et al. | |
| 2003/0094426 A1 | 5/2003 | Umezawa et al. | |
| 2003/0095894 A1 | 5/2003 | Umezawa et al. | |
| 2004/0262209 A1 | 12/2004 | Umezawa et al. | |

FOREIGN PATENT DOCUMENTS

| | | |
|---|---|---|
| EP | 1 055 446 A2 | 11/2000 |
| EP | 1 055 447 A2 | 11/2000 |
| JP | 06-312190 | 11/1994 |
| JP | 2000-015269 A | 1/2000 |
| JP | 2001-054792 | 2/2001 |
| JP | 2001-219177 A | 8/2001 |
| JP | 2001-276773 A | 10/2001 |
| JP | 2001-334265 A | 12/2001 |
| JP | 2003-071469 A | 3/2003 |
| JP | 3483482 | 10/2003 |
| JP | 2004-042041 A | 2/2004 |
| JP | 2004-249251 A | 9/2004 |
| KR | 10-2001-0087434 | 9/2001 |
| WO | WO-2004/018369 | 3/2004 |

OTHER PUBLICATIONS

Chinese Office Action dated Aug. 18, 2006, directed to counterpart CN application No. 2005100739813.

* cited by examiner recovering calcium fluoride recycling or releasing of the water

APPARATUS FOR TREATING WATER

BACKGROUND OF THE INVENTION

Priority is claimed to Japanese Patent Application Number JP2004-162683 filed on Jun. 1, 2004, the disclosure of which is incorporated herein by reference in its entirety.

1. Field of the Invention

The invention relates to a treatment apparatus for removing fluorine content from water to be treated and a method of treating water to be treated using the treatment apparatus.

2. Description of the Related Art

Currently, the reduction of industrial wastes and the separating and recycling of industrial wastes are important subjects from an ecological standpoint and are urgent issues for companies. The industrial wastes include various fluids containing substances to be removed.

The fluids mentioned above are expressed as various terms, such as the terms "sewage", "waste water", and "liquid waste". Fluid, such as water or chemicals, containing a substance to be removed will be hereinafter called "waste water" and described. The waste water may be recycled into a clean fluid for reuse by removing the substance to be removed from the waste water, such as by using a costly filtration apparatus to filter out the substance to be removed from the waste water. Moreover, the substance to be removed, which is separated from the waste water, may undergo treatment for industrial waste. Water, in particular, is made clean by filtration to meet environmental quality standards so that the water is released into nature, such as rivers or the sea, or is recycled for reuse.

In the course of a process for manufacturing a semiconductor device, large quantities of waste water are produced. In an etching process of the manufacturing process, waste water having fluorine content such as hydrofluoric acid is discharged. It is known that the discharge of waste water containing a high concentration of fluorine into nature causes a disturbance in ecological balance. The removal of fluorine content from waste water is therefore of extreme industrial importance.

The conditions of the release of waste water having fluorine content are set, based on a reference value prescribed by, for example, the Water Pollution Prevention Law or municipal laws. Specifically, the concentration of fluorine contained in waste water must be equal to or less than 8 mg/L. Moreover, regulations may be carried out on the total amount of fluorine discharged.

There are proposed various techniques for removing fluorine contained as mentioned above. There is proposed a technique for removing fluorine contained in waste water, which involves using different treatment tanks for biological treatment and chemical treatment. This technique is described for instance in Japanese Patent Application Publication No. 2001-54792. Another technique for removing fluorine content involves preparing a plurality of reaction tanks; then adding calcium to raw water contained in one of the reaction tanks, thereby forming a seed agent containing a substance in sol form; and adding the seed agent to raw water contained in the other or another tank, thereby treating fluorine content. This technique is described for instance in Japanese Patent Application Publication No. Hei 06-312190. The technique for removing fluorine further includes employing a coagulating sedimentation, which involves using a polymer flocculant to coagulate fluorine contained in waste water, thereby extracting sludge from the waste water.

However, a method of treating waste water having fluorine content, as disclosed in the publication No. 2001-54792, has to include a plurality of steps of treating waste water. Thus, the method has the problem of raising costs due to large-scale facilities required for these steps. The method further has the problem of having difficulty in achieving stable waste water treatment because of using organisms to treat organic content.

A method of treating waste water, as disclosed in the publication No. Hei 06-312190, has the problem of having to include an additional step of treatment such as coagulation in order to solidify fluorine content derived from waste water, because the waste water contains an extremely low concentration of fluorine.

The technique for removing fluorine contained in waste water, employing the coagulating sedimentation using a commercially available polymer flocculant, has the problem of large quantities of sludge being extracted from the waste water and resulting in industrial wastes. The technique further has the problem of rendering it difficult to recycle the sludge, because the sludge has large quantities of flocculant mixed therein.

SUMMARY OF THE INVENTION

The invention provides a treatment apparatus which permits the removal, recovery and recycling of fluorine content from water to be treated without the use of a flocculant, and a method of treating water to be treated using the treatment apparatus.

The invention provides a treatment apparatus that includes a treatment tank which contains water to be treated, which has fluorine content; a supplying device which adds calcium to the treatment tank to form calcium fluoride; and a filter film which filters the water to be treated in the treatment tank, thereby concentrating the calcium fluoride contained in the water to be treated.

The invention provides a treatment apparatus that includes a first treatment tank which contains water to be treated, which has fluorine content; a supplying device which adds calcium to the first treatment tank to form calcium fluoride; a second treatment tank which receives the water to be treated, containing the calcium fluoride, from the first treatment tank; and a filter film which filters the water to be treated in the second treatment tank, thereby concentrating the calcium fluoride contained in the water to be treated.

The invention provides a method of treating water to be treated, that includes adding calcium to water to be treated, which has fluorine content, thereby forming calcium fluoride; and filtering the water to be treated, thereby concentrating the calcium fluoride contained in the water to be treated.

The invention provides a method of treating water to be treated, that includes adding calcium to water to be treated, which has fluorine content and is contained in a first treatment tank, thereby forming calcium fluoride; introducing the water to be treated, containing the calcium fluoride, into a second treatment tank; and filtering the water to be treated in the second treatment tank, thereby concentrating the calcium fluoride contained in the water to be treated.

The invention provides a method of treating water to be treated, that includes allowing a first treatment tank to contain water to be treated, which has fluorine content; adding calcium to the first treatment tank, thereby forming calcium fluoride made of at least part of the fluorine and the calcium; introducing the water to be treated, containing the calcium fluoride, into a second treatment tank; adding calcium to the second treatment tank, thereby forming calcium fluoride made of the fluorine remaining in the water to be treated and the calcium; returning part of the water to be treated in the second treatment tank to the first treatment tank; and filtering the water to be treated in the second treatment tank, thereby concentrating the calcium fluoride contained in the water to be treated.

Therefore, according to the treatment apparatus and method of the invention, almost all of fluorine contained in water to be treated can be immobilized as calcium fluoride, so that the calcium fluoride contained in the water to be treated can be concentrated with high concentration. Thus, the apparatus and the method of the invention have the advantage of facilitating the removal, recovery and recycling of the calcium fluoride. Moreover, the apparatus and the method of the invention eliminate the need to use a polymer flocculant or the like, thus achieving high-purity calcium fluoride, and thus contributing to the recycling of the calcium fluoride.

DETAILED DESCRIPTION OF THE PREFERRED EMBODIMENTS

First Embodiment

The detailed description will be given with regard to an apparatus and method of treating fluorine-containing water to be treated according to a first embodiment of the invention. Firstly, the description is given with reference to FIG. 1 with regard to the method of treating water to be treated using a treatment apparatus 10A. The description is now given with regard to the method using one treatment tank 11 for treatment.

In the first embodiment, water to be treated is waste water having fluorine content. The waste water is discharged when an etching process takes place at a semiconductor factory. More specifically, the processes for etching a semiconductor, a glass, a metal, and so on result in the discharge of large quantities of waste water having fluorine content. In these etching processes, hydrofluoric acid is used to improve corrosive properties for etching. As employed herein, hydrofluoric acid refers to an aqueous solution of hydrogen fluoride (HF). Thus, the discharged waste water resulting from the etching process contains highly dangerous hydrofluoric acid.

Figure 1:
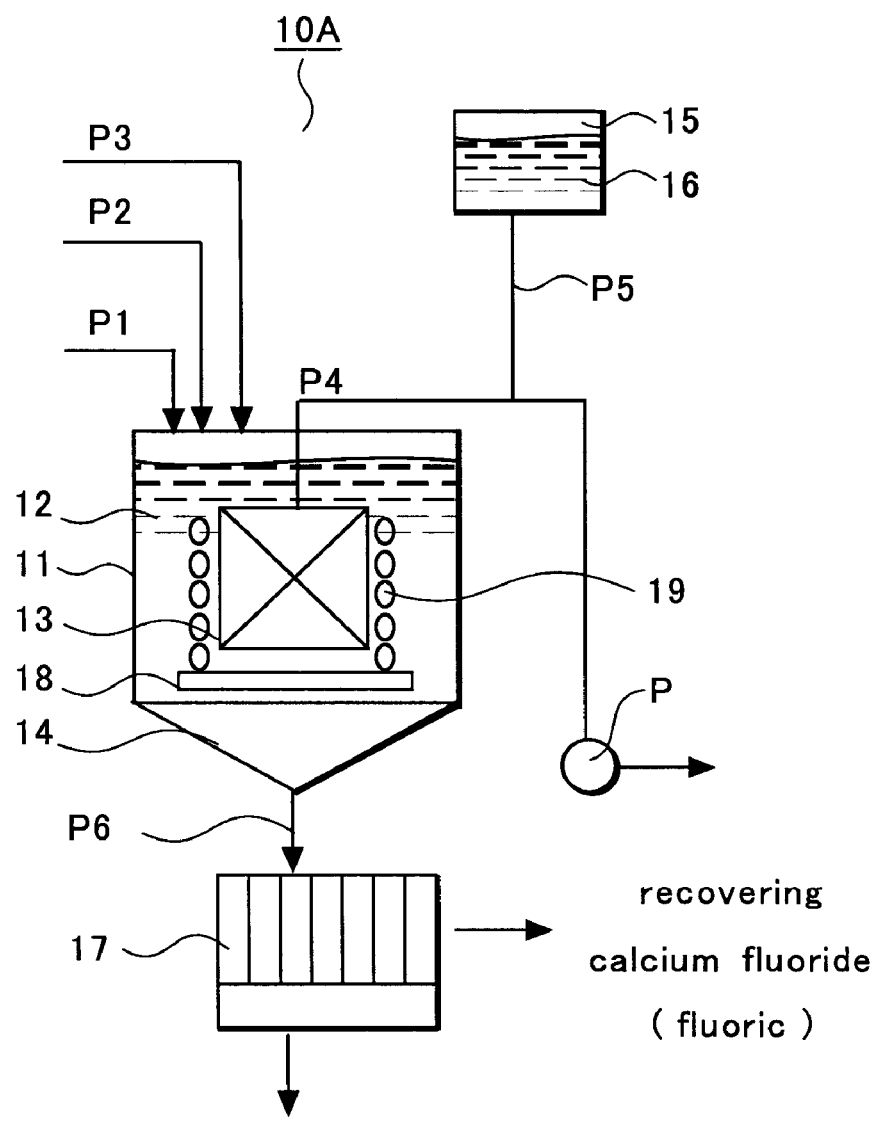
FIG. 1 is a schematic illustration showing a treatment apparatus according to the preferred embodiments of the invention.

The treatment apparatus 10A shown in FIG. 1 is configured to include the treatment tank 11 that contains water 12 to be treated, and a filter film 13 immersed in the water 12 to be treated.

A first path P1 is a water path such as a pipe. The water 12 to be treated is transported into the treatment tank 11 over the first path P1. A pump for transporting the water to be treated may be disposed on the first path P1. In the first embodiment, the water 12 to be treated is waste water containing hydrofluoric acid. The water 12 to be treated, which contains calcium fluoride formed by fluorine content combining with calcium content, may be introduced into the treatment tank 11 over the first path P1.

A second path P2 is a path over which slaked lime (or calcium hydroxide) ($Ca(OH)_2$) is introduced into the treatment tank 11. In the first embodiment, slurry made of an aqueous solution of slaked lime is charged into the water 12 to be treated, which is contained in the treatment tank 11, over the second path P2. The addition of slaked lime to the water 12 to be treated causes a reaction to form calcium fluoride, which is expressed by the following equation (A). In the first embodiment, slurry made of an aqueous solution containing 5 wt % slaked lime is introduced into the water 12 to be treated over the second path P2.

$$Ca^{2+} + 2F^- \rightarrow CaF_2 \qquad (A)$$

The hydrofluoric-acid-containing water to be treated is acid. When slaked lime is added to the water to be treated, the water increases in pH and thus becomes alkaline. Specifically, the water to be treated, having slaked lime added thereto, has a pH of about 10, which is strongly alkaline. Thus, increasing the pH of the water to be treated allows accelerating the combination of calcium content and fluorine content. For the combination, the optimum pH of the water to be treated is about 10.5. Thus, in the first embodiment, immobilization of fluorine content is closely related to the pH of the water to be treated. Therefore, the method of the first embodiment may include measuring the pH of the water 12 to be treated, and adding the calcium mentioned above. The method may further include predetermining the required amount of calcium, and then adding the predetermined amount of calcium.

A third path P3 is a path over which calcium chloride ($CaCl_2$) is added to the water 12 to be treated. Calcium chloride, in the form of slurry of an aqueous solution, can be introduced into the water to be treated, as in the case of the slaked lime mentioned above. Since calcium chloride is salt, the addition of this substance to the water to be treated does not cause a change in the pH of the water to be treated. Specifically, the addition of calcium chloride to the water to be treated allows the addition of calcium without changing the pH of the water to be treated.

The method of the first embodiment can also include adding, for example, caustic soda (or sodium hydroxide) (NaOH) to the water 12 to be treated, thereby neutralizing the water 12 to be treated with the added substance; and then adding calcium chloride to the water 12 to be treated over the third path P3.

In the first embodiment, both slaked lime and calcium chloride can be adopted as calcium content to be added to the water to be treated. Adoption of slaked lime alone as calcium content may cause an excessive increase in the pH of the water to be treated, thus inhibiting fluorine content from combining with calcium content. In the first embodiment, calcium chloride, which does not cause a change in the pH of the water to be treated, is therefore used as part of calcium content. When calcium chloride alone, instead, is adopted as calcium content to be added to the water 12 to be treated, several problems arise. For example, the problems are that large quantities of chlorine remain in the water to be treated, and that the pH is out of adjustment. Moreover, the addition of an excessive amount of slaked lime to the water to be treated leads to forming a colloidal substance having calcium content. The colloidal substance may inhibit the formation of calcium fluoride of the first embodiment. For the reason mentioned above, both slaked lime and calcium chloride are adopted as calcium content to be added to the water 12 to be treated.

The description is given with regard to the extent to which the addition of slaked lime to the water to be treated permits the removal of fluorine contained in the water to be treated. First, the solubility product of calcium fluoride is expressed by the following equation (B), provided that temperature is 20 degrees C.

$$Ksp=[Ca^{2+}][F^-]^2=8.6\times 11^{-11} \quad (B)$$

The reference value of the release of fluorine ions is −8 mg/L. Thus, the water to be treated may have a pH of about 10.4, based on the solubility product of calcium fluoride and the solubility of slaked lime. In this instance, the calculated concentration of fluorine ions is equal to 4.8 mg/L. Theoretically, the addition of slaked lime to the water to be treated allows the removal of fluorine to such an extent that the water can be released into nature.

In the first embodiment, calcium chloride as well as slaked lime is added to the water to be treated as calcium content. This enables a further removal of fluorine ions, thus reducing to 1 mg/L or less the concentration of fluorine ions contained in the water to be treated.

The filter film 13 is immersed in the water 12 to be treated, which is contained in the treatment tank 11. The filter film 13 acts to filter the water 12 to be treated. A filtering mechanism capable of filtration in a fluid can be generally adopted as the filter film 13. In the first embodiment, filtration takes place using a self-developing film formed on the surface of the filter film 13, thereby achieving solid-liquid separation between calcium fluoride and the water 12 to be treated. This allows concentrating calcium fluoride contained in the water to be treated. The details of the self-developing film will be described later.

The self-developing film mentioned above can be made of calcium fluoride formed in the water 12 to be treated. Specifically, the water 12 to be treated is filtered through calcium fluoride adsorbed on the filter surface of the filter film 13. During the recovery of calcium fluoride, the self-developing film is also peeled off and recovered from the filter film 13.

A diffuser 18 acts to supply bubbles to the filter film 13 from underneath in the water 12 to be treated. Specifically, the diffuser 18 receives the supply of gas from, for example, an external pump (not shown). The diffuser 18 evolves bubbles 19, which then move upward along the filter surface of the filter film 13. Thus, the diffuser 18 can evolve the bubbles so that the self-developing film formed on the surface of the filter film 13 has a given or less thickness. This allows preventing clogging of the self-developing film, thus achieving filtration of the water 12 to be treated, while ensuring flux to some extent.

A fourth path P4 is a path through which the water 12 to be treated passes after undergoing filtration through the filter film 13. A pump P is disposed on the fourth path P4. The suction of the pump P is applied to the filter film 13 for filtration.

A fifth path P5 is a path branching off from the fourth path P4, through which part of filtered water 16 passes. As employed herein, the filtered water 16 refers to filtered water obtained through the filtration of the water 12 to be treated.

A tank 15 is a tank that temporarily stores the filtered water 16 which has passed through the fifth path P5. The capacity of the tank 15 can be smaller than that of the treatment tank 11. The filtered water 16 stored in the tank 15 can flow back to the filter film 13 so that the filtered water 16 is used to peel off the self-developing film formed on the surface of the filter film 13. Moreover, the tank 15 can be located above the level of the water 12 to be treated so that the filtered water 16 flows back without the use of, for example, a pump.

When the calcium described above is added to the water 12 to be treated, fluorine content is immobilized to form calcium fluoride. The immobilized calcium fluoride precipitates to form a precipitate 14 at the bottom of the treatment tank 11. The precipitate 14 is transported to a filter press 17 via a sixth path P6. The filter press 17 is used to dewater the precipitate 14 so as to recover a semisolid containing a high concentration of calcium fluoride. The filter press 17 performs rough filtration, thus yielding a translucent fluid containing calcium fluoride. The fluid may be returned to the treatment tank 11 so as to be used as the water 12 to be treated.

The first embodiment enables solid-liquid separation without the use of a flocculant such as a polymer flocculant, thus deriving immobilized calcium fluoride of high purity from waste water having fluorine content. The derived calcium fluoride can be allowed to react with a strong acid (e.g., sulfuric acid) to form hydrofluoric acid, which is then recycled for reuse in, for example, a process for manufacturing a semiconductor. Moreover, the high-purity calcium fluoride derived by the first embodiment can be used as flux to be mixed into steel. Moreover, hydrochloric acid can be added to the derived calcium fluoride to yield calcium chloride. Furthermore, the recycling of calcium fluoride can be achieved without the need for a semiconductor factory to include additional facilities, because sulfuric acid or hydrochloric acid to be added for the recycling of calcium fluoride, for example, is a chemical agent which the semiconductor factory stocks regularly.

Figure 2:
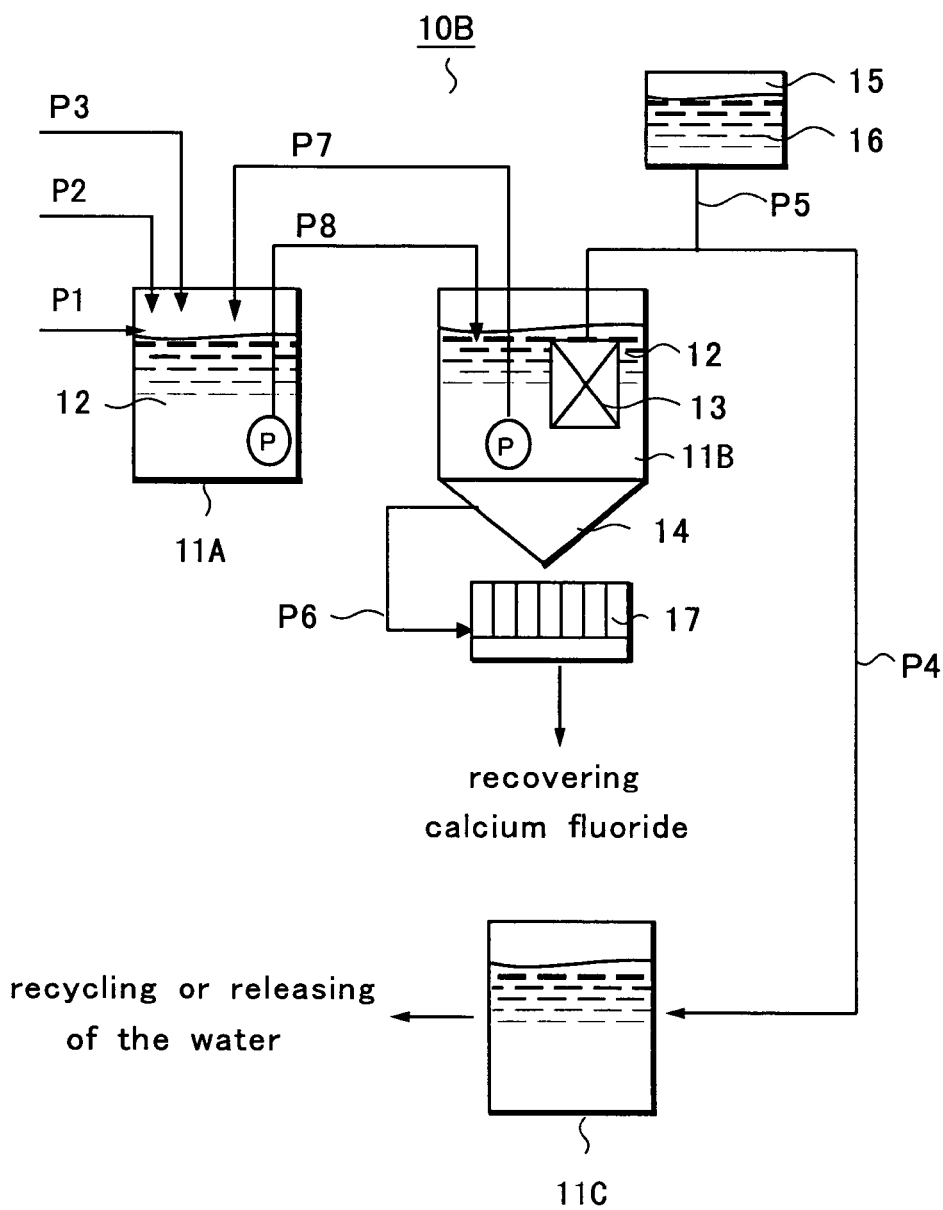
FIG. 2 is a schematic illustration showing a treatment apparatus according to the preferred embodiments of the invention.

The description is now given with reference to FIG. 2 with regard to a method of treating water to be treated using a treatment apparatus 10B according to another embodiment. The basic configuration of the treatment apparatus 10B shown in FIG. 2 is the same as that of the treatment apparatus 10A described with reference to FIG. 1. The treatment apparatus 10B is different from the treatment apparatus 10A in that the treatment apparatus 10B includes a plurality of treatment tanks 11 for treatment of water 12 to be treated. Specifically, two treatment tanks 11, that is, a first treatment tank 11A and a second treatment tank 11B, are used to treat the water 12 to be treated.

First, second and third paths P1, P2 and P3 are the same as the above-described paths P1, P2 and P3, respectively. Specifically, the water to be treated, slaked lime, and calcium chloride are introduced into the first treatment tank 11A over the first, second and third paths P1, P2 and P3, respectively.

The first treatment tank 11A contains the fluorine-containing water 12 to be treated. When calcium is added to the water 12 to be treated over the second and third paths P2 and P3, fluorine content combines with calcium content to form calcium fluoride. The formed calcium fluoride precipitates at the bottom of the first treatment tank 11A. The principle of the formation of calcium fluoride is the same as that described with reference to FIG. 1.

Even when the necessary and sufficient amount of calcium for immobilization of fluorine content in the form of calcium fluoride is added to the water 12 to be treated in the first treatment tank 11A, the immobilization of fluorine content may be achieved inadequately. The reason is as follows. In an actual environment, calcium fluoride in a metastable state is present in the water 12 to be treated. When calcium fluoride is in the metastable state, the immobilization of fluorine content does not occur. Thus, the water 12 to be treated, which is in this state, does not meet the reference for release. In the embodiment shown in FIG. 2, the state of calcium fluoride can be changed from the above-mentioned unstable state to a stable state so that the water 12 to be treated meets the reference for release. Specifically, large quantities of calcium such as slaked lime and calcium chloride are added to the water 12 to be treated, so that calcium fluoride contained in the water to be treated enters a stable state.

An eighth path P8 is a path over which the water 12 to be treated is transported from the first treatment tank 11A to the second treatment tank 11B. In this case, the water 12 to be treated contains calcium fluoride formed through the treatment of the water 12 in the first treatment tank 11A. A pump immersed in the water 12 to be treated is disposed on the eighth path P8. The pressure of the pump is applied to transport the water 12 to be treated from the first treatment tank 11A to the second treatment tank 11B. A precipitate at the bottom of the first treatment tank 11A may be preferentially transported to the second treatment tank 11B for the purpose of an improvement in the efficiency of the second treatment tank 11B in filtering calcium fluoride.

The second treatment tank 11B stores the water 12 to be treated, which has undergone treatment in the first treatment tank 11A. The second treatment tank 11B further includes the above-described filter film 13 immersed in the water 12 to be treated. The filter film 13 is used to filter and thus concentrate the water 12 to be treated in the second treatment tank 11B. As mentioned above, the water 12 to be treated, which contains the precipitate in the first treatment tank 11A, is introduced into the second treatment tank 11B. This yields a very high concentration of calcium fluoride in the second treatment tank 11B. Specifically, calcium fluoride in the second treatment tank 11B can be concentrated so that the concentration of calcium fluoride lies between about 2000 and 3000 mg/L. The water 12 to be treated is concentrated as mentioned above, which facilitates the recovery of solid matter using filter press 17.

A seventh path P7 is a path over which the water 12 to be treated, containing a high concentration of calcium fluoride, is returned from the second treatment tank 11B to the first treatment tank 11A. The pressure of a pump immersed in the second treatment tank 11B is used to return the water 12 to be treated. In the second treatment tank 11B, the filter film 13 is used for filtration, thus yielding a very high concentration of calcium fluoride. In the second treatment tank 11B, the water 12 to be treated further contains a high concentration of calcium creating no combination with fluorine content. Thus, part of the water 12 to be treated, containing a high concentration of these components, can be returned to the first treatment tank 11A so that the formation of calcium fluoride is accelerated in the first treatment tank 11A. Specifically, calcium fluoride contained in the returned water 12 to be treated functions as a seed crystal to accelerate the formation of calcium fluoride. Moreover, the calcium content that is not yet reacted with the fluorine content can be returned to the first treatment tank 11A. This allows reducing the amount of calcium added, thus reducing the cost of treatment. The configuration of the embodiment shown in FIG. 2, as described above, allows yielding the water 12 to be treated, having an extremely low content of fluorine ion.

A precipitate 14 formed of calcium fluoride precipitating at the bottom of the second treatment tank 11B is transported to the filter press 17 via a sixth path P6, and is dewatered with the filter press 17. Then, the solidified calcium fluoride is recovered and recycled.

The functions and configurations of fourth and fifth paths P4 and P5 and a tank 15 are the same as those described with reference to FIG. 1.

In a third treatment tank 11C, purification takes place for the recycling or release of the water 12 to be treated, which has been passed through the filter film 13. Specifically, the purification involves, for example, pH adjustment, removal of nitrogen content, and removal of calcium content. The pH adjustment involves measuring the pH of the water to be treated, and then adding an alkaline or acidic substance to the water to be treated. In the embodiment shown in FIG. 2, a denitrification technique using electrodes is employed for the removal of nitrogen content. The details of the denitrification technique will be described later. When calcium contained in the water 12 to be treated is subjected to electrolytic process, calcium carbonate ($CaCO_3$) is allowed to float up to the surface of the water 12 to be treated and is recovered. After undergoing this process, the water to be treated is recycled or released.

Figure 3:
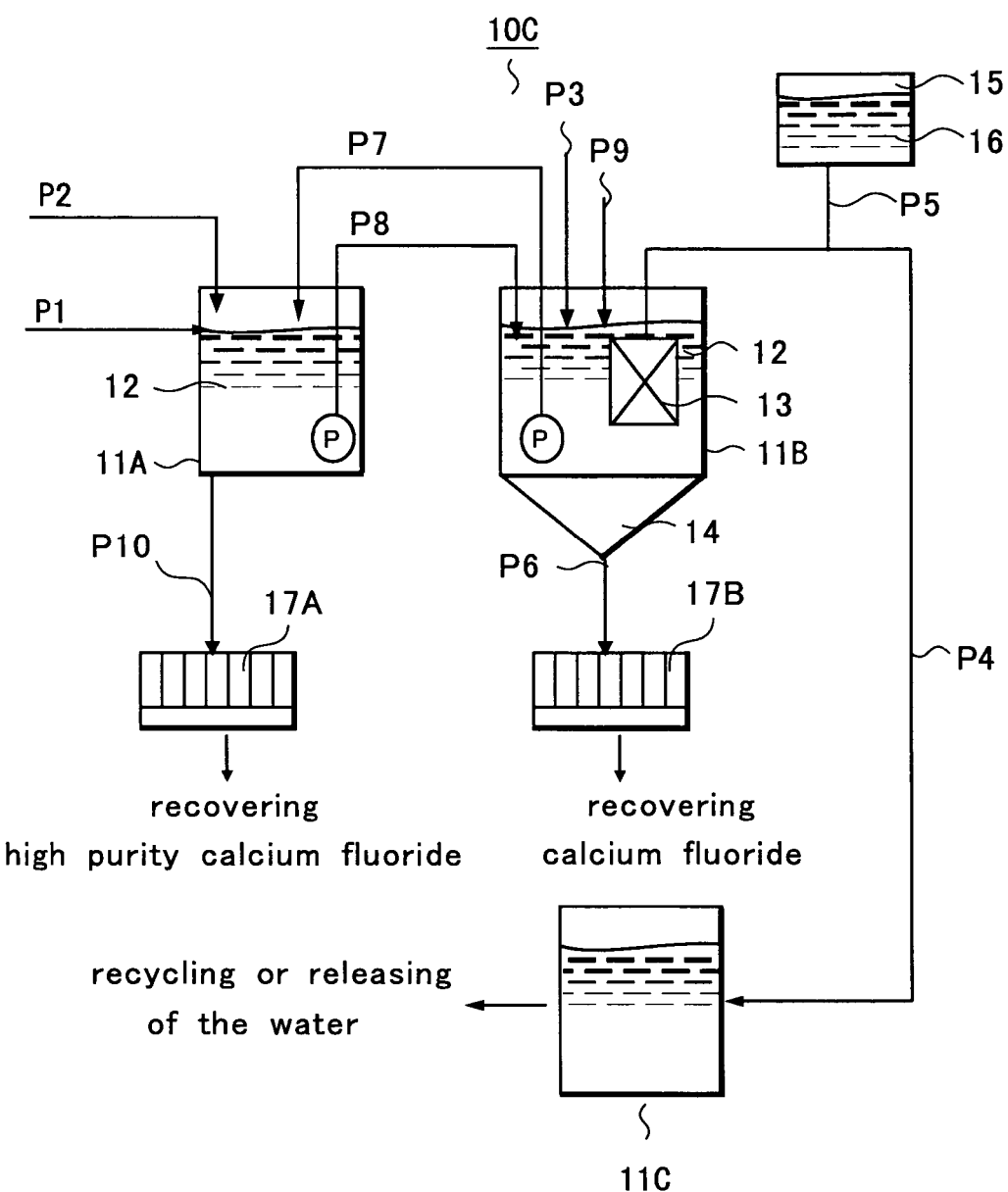
FIG. 3 is a schematic illustration showing a treatment apparatus according to the preferred embodiments of the invention.

The description is now given with reference to FIG. 3 with regard to a method of treating water to be treated using a treatment apparatus 10C according to still another embodiment. In the embodiment shown in FIG. 3, calcium fluoride is recovered from both first and second treatment tanks 11A and 11B. Moreover, in the embodiment, calcium is added to the second treatment tank 11B as well as the first treatment tank 11A. The configuration of the treatment apparatus 10C, except as set forth above, is basically the same as that of the treatment apparatus 10B shown in FIG. 2. The method of treating water to be treated using the treatment apparatus 10C will be described in detail below.

Water 12 to be treated, having fluorine content, is introduced into the first treatment tank 1A over a first path P1. Slaked lime is added to the first treatment tank 11A over a second path P2. In the embodiment shown in FIG. 3, the amount of slaked lime added is such that only part of fluorine contained in the water 12 to be treated is immobilized as calcium fluoride. For example, slaked lime, in such an amount that calcium combines with about 90% of fluorine contained in the water 12 to be treated, is added to the first treatment tank 11A over the second path P2. Thus, calcium content which is not yet reacted with fluorine content can be prevented from remaining in the first treatment tank 11A. Even in the presence of the calcium content that is not yet reacted with the fluorine content, the amount of such calcium can be reduced. Therefore, calcium fluoride of extremely high purity can be obtained from the first treatment tank 11A.

The high-purity calcium fluoride formed by the first treatment tank 11A flows into a first filter press 17A via a tenth path P10. Then, the calcium fluoride formed by the first treatment tank 11A is dewatered with the first filter press 17A to yield a semisolid having a low water content. A high concentration of calcium fluoride is obtained from the semisolid obtained from the first filter press 17A. Thus, the embodiment shown in FIG. 3 has the advantage of facilitating, for example, the extraction of hydrofluoric acid mentioned above.

The water 12 to be treated is transported from the first treatment tank 11A to the second treatment tank 11B via an eighth path P8. The water 12 to be treated, containing a so-called seed agent, is transported from the second treatment tank 11B to the first treatment tank 11A via a seventh path P7. The details of these transport paths are the same as those described above.

A third path P3 is a path over which calcium chloride is added. In the embodiment shown in FIG. 3, calcium chloride is added to only the second treatment tank 11B. Moreover, slaked lime is added to the second treatment tank 11B over a ninth path P9. In other words, in the embodiment shown in FIG. 3, both calcium chloride and slaked lime are added to the water 12 to be treated contained in the second treatment tank 11B. Thus, the second treatment tank 11B treats the water 12 to be treated with emphasis on removing fluorine content, as compared to the first treatment tank 11A. In other words, it can be said that the second treatment tank 11B performs treatment so that the removal of fluorine content has priority over the recycling of obtained precipitate.

A precipitate 14 in the second treatment tank 11B is transported to a second filter press 17B via a sixth path P6. Then, the precipitate 14 is dewatered with the second filter press 17B to yield a semisolid containing calcium fluoride. Solid matter obtained from the second filter press 17B contains a relatively low concentration of calcium fluoride. Thus, an application for which the solid matter obtained from the first filter press 17A is used may be different from an application for which the solid matter obtained from the second filter press 17B is used. Specifically, the solid matter obtained from the first filter press 17A can be recycled and reused as a hydrofluoric acid source, and the solid matter obtained from the second filter press 17B can be recycled and reused as the flux mentioned above.

The configurations and functions of other structural components shown in FIG. 3, such as a tank 15 and a third treatment tank 11C, are the same as those described with reference to FIG. 2.

The treatment apparatus 10C uses two treatment tanks 11 for different treatments of the water to be treated, thus facilitating the recycling of obtained solid matter and achieving the removal of fluorine content. Specifically, in the first treatment tank 11A, slaked lime, in such an amount that part of fluorine content does not react with calcium content but remains in the tank 11A, is added to the water 12 to be treated. Thus, all or almost all of the added slaked lime reacts with fluorine contained in the water 12 to be treated, so that little calcium remains. On the other hand, in the second treatment tank 11B, large quantities of slaked lime are added to the water 12 to be treated so as to ensure that fluorine content which is not yet reacted with calcium content combines with the calcium content. Moreover, in the second treatment tank 11B, calcium chloride is added to the water 12 to be treated in order to prevent an excessive increase in the pH of the water 12 to be treated.

Figure 4A:
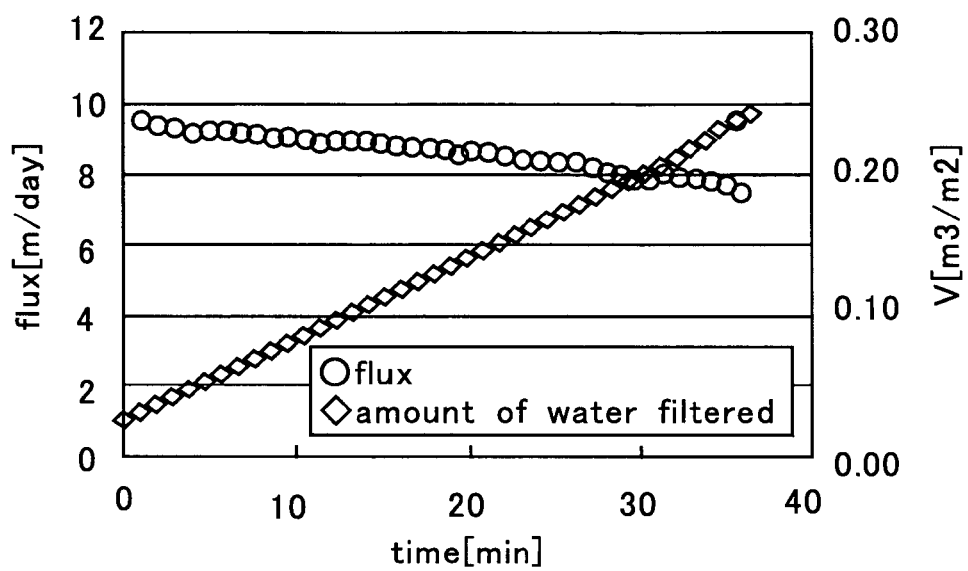
FIGS. 4A and 4B are plots showing the characteristics of the treatment apparatus according to the preferred embodiments of the invention.
Figure 4B:
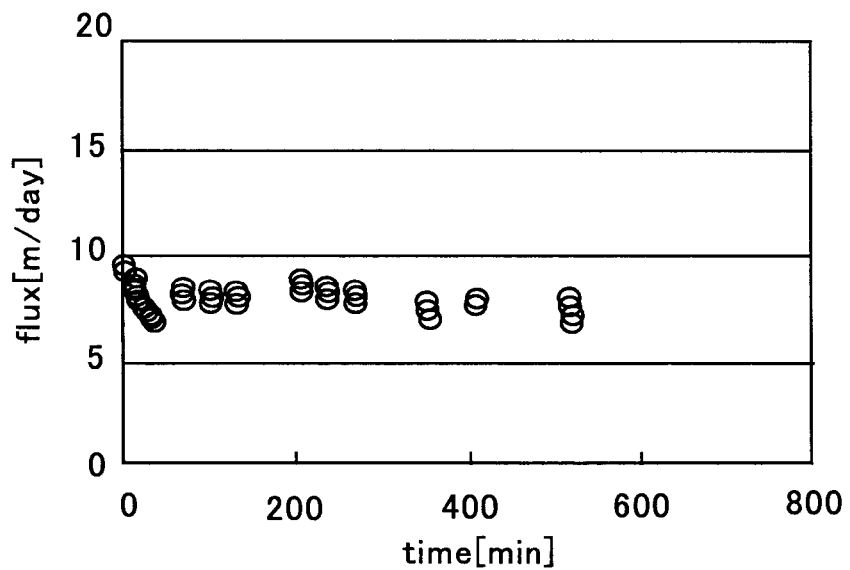

Next, the description is given with reference to FIGS. 4A and 4B with regard to an experimental test on filtration of water 12 to be treated using the filter film 13 shown in FIG. 1. FIG. 4A is a plot showing how the amount of water 12 filtered varies with time, and how flux varies with time. In the plot of FIG. 4A, the horizontal axis represents filtration time, where the filtration keeps occurring. In this plot, the vertical axis on the left represents the level of flux, and the vertical axis on the right represents the amount of water filtered. FIG. 4B is a plot showing how the flux varies with time, where the filtration further keeps occurring. As employed in these drawings, the flux refers to a flux density, and the level of flux is related to the amount of filtered liquid.

Firstly, the description is given with regard to the conditions of the experimental test. The experimental test involved filtering water to be treated by applying a suction pressure of 7 kPa to a filter film having an area of 0.1 m$^2$, and then measuring the amount of water filtered and the flux at regular intervals.

From FIG. 4A, it can be seen that the flux decreases gradually as the amount of water filtered increases. This suggests that at an early stage of the test a self-developing film made of calcium fluoride (i.e., a film deposited in cake form) is formed on the surface of the filter film and clogging of the self-developing film is in gradual progress. For example after a lapse of 37 minutes after the start of the test, the flow rate (or flux) of filtered liquid, however, was 7.5 m/day. This flux value indicates that filtration can occur with sufficient efficiency although clogging of the self-developing film is in progress. The suspended solid of the filtered water was 0 mg/L, and the concentration of fluorine ions was 21 mg/L. Moreover, water to be treated, remaining in a treatment tank, was concentrated and dried to yield solid matter containing calcium fluoride with a concentration of about 500 mg/L. Even after continuous filtration for about 40 minutes, the flux decreased by about 20%. Thus, practicable filtration can be achieved.

FIG. 4B shows measured variations in the flux, where filtration keeps occurring in succession to the above-mentioned filtration. From the flux variations shown in the plot of FIG. 4B, it can be seen that even after continuous filtration for about 600 minutes, the filtration can continue while ensuring the flux value equal to or more than 5 m/day. For the duration of the filtration, the water to be treated, remaining in the treatment tank, is concentrated. Specifically, the water to be treated, remaining in the treatment tank, contains calcium fluoride with a concentration of about 2000 to 3000 mg/L or more. Thus, the filtration using the self-developing film of the first embodiment allows concentrating calcium fluoride contained in the water 12 to be treated, thus yielding an extremely high concentration of calcium fluoride.

Figure 5:
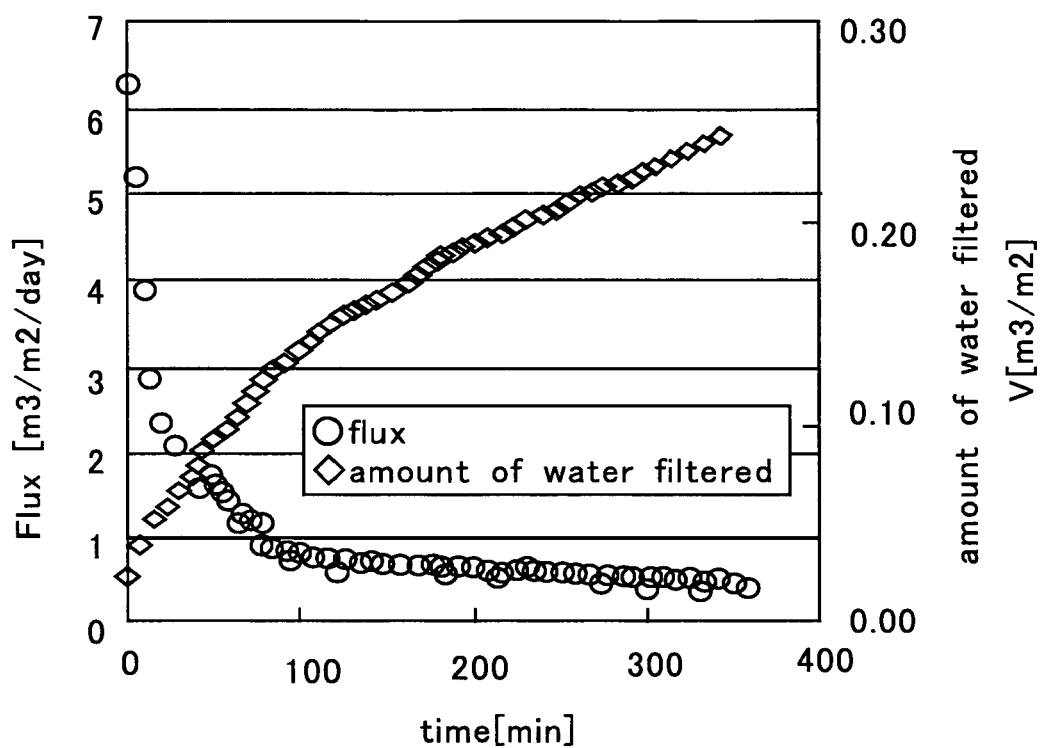
FIG. 5 is a plot showing the characteristics of the treatment apparatus according to the preferred embodiments of the invention.

Next, the description is given with reference to FIG. 5 with regard to the result of an experimental test done under different conditions from the above-mentioned conditions. The conditions of this experimental test are that water to be treated contains an extremely high concentration of hydrofluoric acid. Specifically, the concentration of hydrofluoric acid contained in water 12 to be treated is as high as about 18000 mg/L. The water 12 to be treated has a pH of about 9.9. The conditions of a filter film are the same as those described with reference to FIG. 4A. In a plot of FIG. 5, the horizontal axis represents filtration time, where filtration keeps occurring. In this plot, the vertical axis on the left represents the level of flux, and the vertical axis on the right represents the amount of water filtered.

As is apparent from the plot of FIG. 5, the flux value decreases markedly at an early stage, as compared to the experimental result shown in FIG. 4A. Specifically, after a lapse of 300 minutes, the flux value is 0.3 mg/L, which is very low as compared to the experimental result shown in FIG. 4A and mentioned above. The cause of this phenomenon can be that clogging of the self-developing film occurs at an early stage because the water 12 to be treated contains an extremely high concentration of hydrofluoric acid. Thus, it is possible that the treatment of the water 12 to be treated, containing a high concentration of hydrofluoric acid, requires the refresh of the self-developing film at an early stage. As employed herein, the refresh of the self-developing film refers to the step of removing part or almost all of the self-developing film from the filter film, and then forming a new self-developing film.

Figure 6:
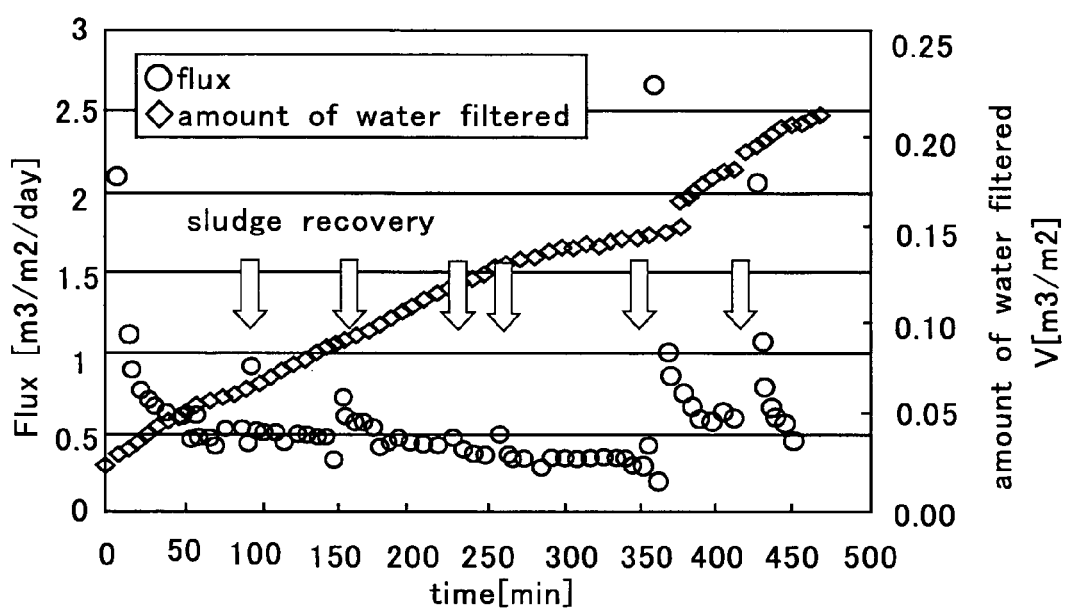
FIG. 6 is a plot showing the characteristics of the treatment apparatus according to the preferred embodiments of the invention.

The description is now given with reference to FIG. 6 with regard to the result of another experimental test done using the same water to be treated as the water for use in the experimental test shown in FIG. 5. In the experimental test shown in FIG. 6, a plurality of sludge recovery processes allow preventing a decrease in the flux mentioned above. The horizontal and vertical axes shown in a plot of FIG. 6 are the same as those shown in FIG. 5.

In the plot of FIG. 6, each of the open arrows indicates the timing of sludge recovery. Within 300 minutes after the start of the test, as many sludge recovery processes as the arrows, that is, four sludge recovery processes take place. Specifically, the sludge recovery is accomplished by extracting sludge precipitating at the bottom of the treatment tank. The recovery of the sludge precipitating in the treatment tank, as mentioned above, allows temporarily increasing the flux from about 0.5 m/L to about 0.8 m/L. The cause of this phenomenon can be that the recovery of the sludge allows reducing the concentration of calcium fluoride contained in the water 12 to be treated in the treatment tank, thus reducing the thickness of the self-developing film, and thus reducing clogging of the self-developing film by a slight amount.

As can be seen from the plot of FIG. 6, two sludge recovery processes take place after a lapse of 300 minutes. In this case, the sludge recovery includes not only recovering sludge content precipitating in the treatment tank 11, but also peeling off the self-developing film. Specifically, the sludge recovery involves allowing filtered water to flow back from the inside of the filter film, thereby peeling off all or part of the self-developing film; and then recovering the sludge from the treatment tank. Thus, re-filtering requires regeneration for forming the filter film. This sludge recovery allows increasing the flux value to about 3 m/L. Therefore, the recovery of the sludge including the self-developing film from the treatment tank is important for long-term operation of a recovery apparatus of the first embodiment. Moreover, the recovered sludge contains a high concentration of calcium fluoride, which is about 200000 mg/L. Thus, the first embodiment has the advantage of facilitating, for example, the recycling of the recovered sludge.

Second Embodiment

Figure 7:
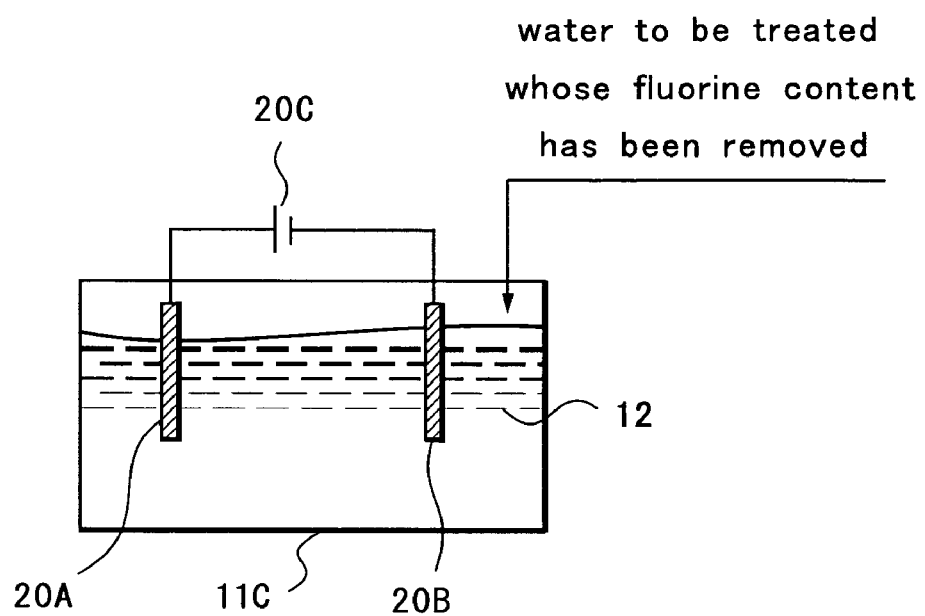
FIG. 7 is a schematic illustration showing a treatment apparatus according to the preferred embodiments of the invention.

A second embodiment of the invention will be described below. Specifically, the description is given with regard to a method of removing, for example, nitrogen content from water to be treated, which is obtained from a treatment apparatus 10 described above. FIG. 7 shows the configuration of a third treatment tank 11C which removes nitrogen content.

Water 12 to be treated, whose fluorine content has been removed by the treatment apparatus 10, is introduced into the third treatment tank 11C. Then, nitrogen contained in the water 12 to be treated is removed by applying a voltage to a pair of electrodes, at least part of which is immersed in the water 12 to be treated. The removal of nitrogen content, as mentioned above, will be described in detail below.

The pair of electrodes immersed in a liquid is composed of an anode 20A and a cathode 20B, and has connections to a power supply 20C which applies a voltage to both the electrodes. A control device for controlling the power supply 20C or an agitating device for agitating the water 12 to be treated in the tank may be provided.

A conductive material containing or coated with Group IB or IIB and Group VIII in the periodic table can be used as the material of the cathode 20B. Specifically, the cathode 20B is made of copper, iron, and an alloy or sintered alloy of copper and zinc, copper and iron, copper and nickel, or copper and aluminum.

An insoluble electrode or a carbon electrode can be used as the anode 20A. The insoluble electrode is made of, for example, an insoluble metal, such as platinum, iridium, or palladium, or an oxide of the metal. A shield wall can be disposed around the anode 20A so as to prevent oxygen gas bubbles originating from the anode 20A from moving toward the cathode 20B.

The description is given with regard to a method of treating nitrogen content using the electrodes configured in the manner as above mentioned.

At least one pair of the anode 20A and the cathode 20B is immersed in the water 12 to be treated, and a current is passed through the electrodes. At the cathode 20B, nitric acid ions contained in the water to be treated undergo a reduction reaction and thus undergo conversion into nitrite ions (equation (C)). Moreover, the nitrite ions formed by the reduction reaction of the nitric acid ions undergo a reduction reaction and thus undergo conversion into ammonia (equation (D)). The equations (C) and (D) are given below.

  (C)

  (D)

At the anode 20A, active oxygen or hypochlorous acid is generated from the surface of the anode 20A, and thus nitrogen gas is generated by the denitrification action of the ammonia in the water to be treated (equation (E)). Halogen ions, such as chlorine ions, iodine ions or bromine ions, or a compound containing the halogen ions, such as sodium chloride or potassium chloride, is added to the water to be treated in order to accelerate a denitrification reaction upon the ammonia at the anode 20A. The concentration of the chlorine ions of the sodium chloride added to the water to be treated lies between 10 and 40000 ppm inclusive, for example. When sodium chloride, for instance, is added to the water to be treated, the sodium chloride undergoes oxidation to form chlorine at the anode (equation (F)), and the formed chlorine reacts with water to form hypochlorous acid in the water to be treated (equation (G)). Then, the formed hypochlorous acid reacts with the ammonia in the water to be treated, undergoes a plurality of chemical changes, and then undergoes conversion into nitrogen gas (equation (H)). The equations (E) to (H) are given below. Since the second embodiment may include adding calcium chloride to the water 12 to be treated, chlorine ions electrolytically dissociated from the calcium chloride are present in the water 12 to be treated. Therefore, the second embodiment has the advantage of facilitating electrolytic process for removing nitrogen content from the water 12 to be treated.

  (E)

  (F)

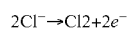

  (G)

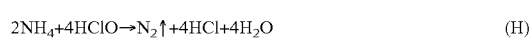  (H)

Thus, the second embodiment enables the in-tank treatment of nitrogen compounds in the water to be treated, such as nitrate nitrogen, nitrite nitrogen, and ammonia nitrogen.

Moreover, calcium contained in the water to be treated undergoes the above-described electrolytic process to form calcium carbonate ($CaCO_3$), which floats up to the surface of the water 12 to be treated. The recovery of the floating calcium carbonate ($CaCO_3$) allows the recovery of calcium content remaining in the water 12 to be treated. Moreover, the recovered calcium carbonate ($CaCO_3$) can be recycled. Moreover, neutralization may take place within the third treatment tank 11C in order that the pH of the water 12 to be treated may be close to neutral.

Third Embodiment

A third embodiment of the invention will be described below. Specifically, the description is given with regard to the details of a filtering mechanism applicable to a filter film 13 of the first embodiment, which is immersed in water 12 to be treated. Although the description is given with regard to the third embodiment where a self-developing film is used as the filtering mechanism, a filtration apparatus in other forms may be applied to the preferred embodiments of the invention.

Figure 8:
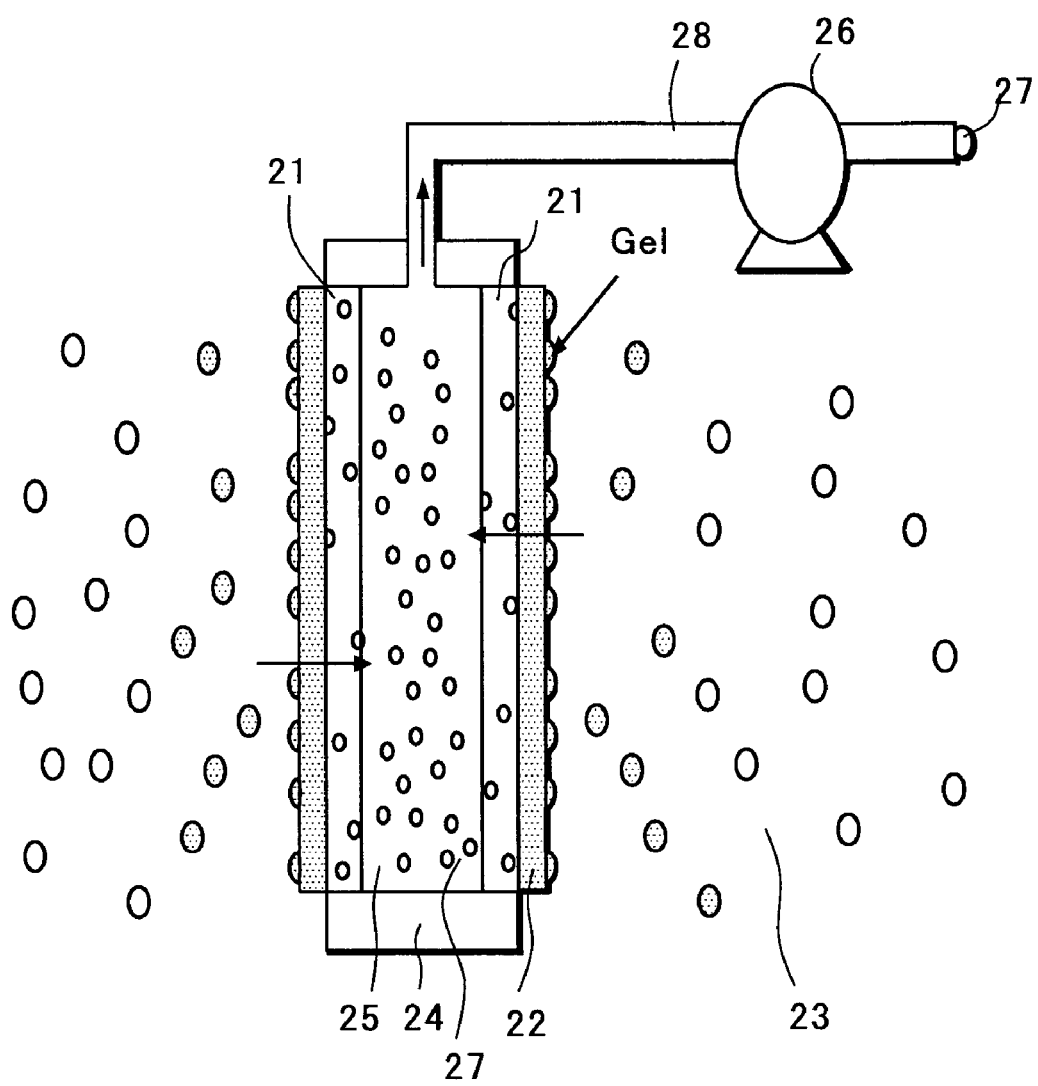
FIG. 8 is an illustration showing a filter apparatus as applied to the treatment apparatus according to the preferred embodiments of the invention.

Referring to FIG. 8 and the following drawings, there is shown a filter apparatus for use in the third embodiment, in which a filter formed of a self-developing film made of a substance to be removed, specifically calcium fluoride, is used to remove a fluid (i.e., water to be treated) having the substance mixed therein.

Specifically, the filter apparatus of the third embodiment includes a first filter 21 and a second filter 22 formed on the surface of the first filter 21. The first filter 21 is made of an organic polymer. The second filter 22 is formed of a self-developing film made of calcium fluoride which is a substance to be removed. The second filter 22, which is the self-developing film, is used to filter water to be treated, containing the substance to be removed.

Either of an organic polymer and ceramics can, in principle, be used as the first filter 21, provided that the filter permits deposition of the self-developing film. In this instance, a polyolefine polymer film having an average pore size of 0.25 µm and a thickness of 0.1 mm is used as the first filter 21. In FIG. 9B, there is shown a photographic image of the surface of a filter film made of polyolefine.

The first filter 21 has a flat film structure in which the filters are disposed on both surfaces of frame 24. The first filter 21 is immersed perpendicularly to a fluid. A pump 26 can be used to suck out filtered liquid 27 from hollow 25 of the frame 24.

The second filter 22 is the self-developing film, which is deposited on the overall surface of the first filter 21 and solidified through the suction of particles into which substances to be removed are agglomerated. The self-developing film may be agglomerated in gel form.

Figure 9A:
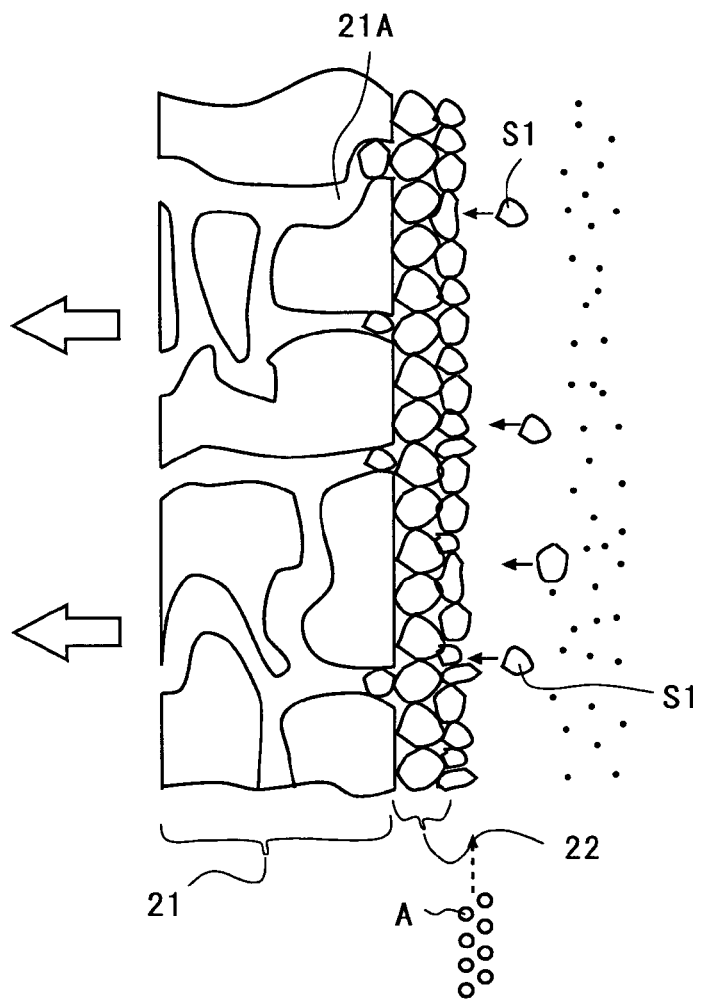
FIG. 9A is an illustration showing the principle of operation and FIG. 9B is an enlarged view of a first filter of the filter apparatus according to the preferred embodiments of the invention.
Figure 9B:
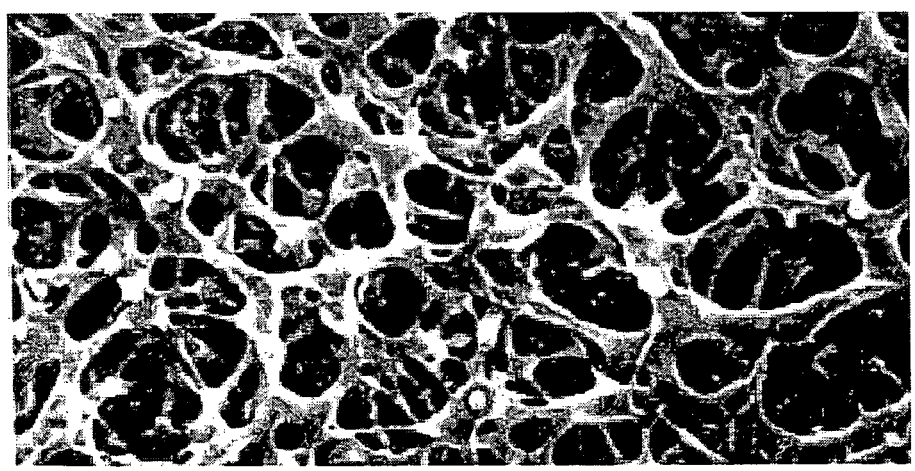

The description is now given with reference to FIGS. 8 and 9A with regard to the formation of the second filter 22 that is the self-developing film made of the substance to be removed, and filtration for the removal of the substance to be removed. The fluid (i.e., water to be treated) having calcium fluoride mixed therein is diffused in a fine-particle state in the water 12 to be treated.

Referring to FIG. 9A, there are shown the first filter 21 and the second filter 22. The first filter 21 has many filter pores 21A. The second filter 22 is the self-developing film made of the substance to be removed, which is formed in a laminar fashion in openings of the filter pores 21A and on the surface of the first filter 21. Agglomerated particles of the substances to be removed, which are made of calcium fluoride, are present on the surface of the first filter 21. When the agglomerated particles are sucked through the first filter 21 by a suction pressure from the pump, water content in the fluid is sucked off. Thus, the agglomerated particles are dried (or dewatered) and immediately solidified. Thus, the second filter 22 is formed on the surface of the first filter 21.

Since the second filter 22 is formed of the agglomerated particles of the substances to be removed, the second filter 22 immediately grows to a predetermined film thickness. The second filter 22 is used to start filtering the agglomerated particles of the substances to be removed. When filtration continues using the pump for suction, the self-developing film of the agglomerated particles is stacked and becomes thicker on the surface of the second filter 22. Thus, the second filter 22 soon becomes clogged and cannot continue filtering. In the meantime, the calcium fluoride that is the substance to be removed is solidified and deposited on the surface of the second filter 22, and the water to be treated passes through the first filter 21 and is extracted as filtered water.

As shown in FIG. 9A, the water to be treated, in which the substance to be removed is mixed, is present on one surface of the first filter 21, and the filtered water, which has passed through the first filter 21, is formed on the other surface of the first filter 21. The water to be treated is sucked and flows in the direction of the arrow of FIG. 9A. By this suction, the agglomerated particles in the water 12 to be treated become solidified as they come closer to the first filter 21. Moreover, the self-developing film into which several agglomerated particles are combined is adsorbed on the surface of the first filter 21, thus forming the second filter 22. The second filter 22 acts to filter the water to be treated, while solidifying the substance to be removed in a colloidal solution.

When the water to be treated, which is the colloidal solution, is slowly sucked through the second filter 22 as mentioned above, water in the water to be treated is extracted as the filtered water. Moreover, the substance to be removed is dried, solidified and stacked on the surface of the second filter 22. Moreover, the agglomerated particles of the substances to be removed are captured as the self-developing film.

The first filter 21 is immersed standing perpendicularly to the water to be treated, and the substance to be removed is dispersed in the water to be treated. When the water to be treated is sucked through the first filter 21 by a slight suction pressure from the pump, the agglomerated particles of the substances to be removed are combined with one another on the surface of the first filter 21 and are adsorbed on the surface of the first filter 21. Incidentally, agglomerated particle S i having a smaller particle diameter than the pore size of the filter pore 21A passes through the first filter 21. However, this presents no problem because in a process for depositing the second filter 22 the filtered water is circulated again to form the water to be treated. In the depositing process, the water to be treated is sucked by an extremely slight suction pressure. Thus, the agglomerated particle S1 is stacked while forming interstices of various shapes, thus yielding the second filter 22 made of a soft self-developing film having an extremely high degree of swelling. The water in the water to be treated permeates through the self-developing film having a high degree of swelling, is then sucked, then passes through the first filter 21, and is then extracted as the filtered water. Finally, the water to be treated is filtered.

A parallel flow of the water to be treated is produced along the surface of the first filter 21 by feeding air bubbles A from the bottom of the water to be treated. The parallel flow is produced in order that the second filter 22 is uniformly deposited on the overall surface of the first filter 21 and that the soft second filter 22 having interstices formed therein is deposited. Specifically, an air flow rate is set to 1.8 liters per minute, and the air flow rate is selected according to the film quality of the second filter 22.

Then, in a filtering process, the agglomerated particle S1 made of calcium fluoride is adsorbed and gradually stacked on the surface of the second filter 22 by a slight suction pressure. In the meantime, purified water permeates through the second filter 22 and the further stacked agglomerated particles S1, and is extracted as the filtered water through the first filter 21.

However, when filtration continues for a long time, a thick self-developing film is deposited on the surface of the second filter 22, and thus the interstices soon become clogged. As a result, the extraction of filtered water becomes impossible. Therefore, the restoration of the capability of filtration requires the removal of the stacked self-developing film.

Figure 10:
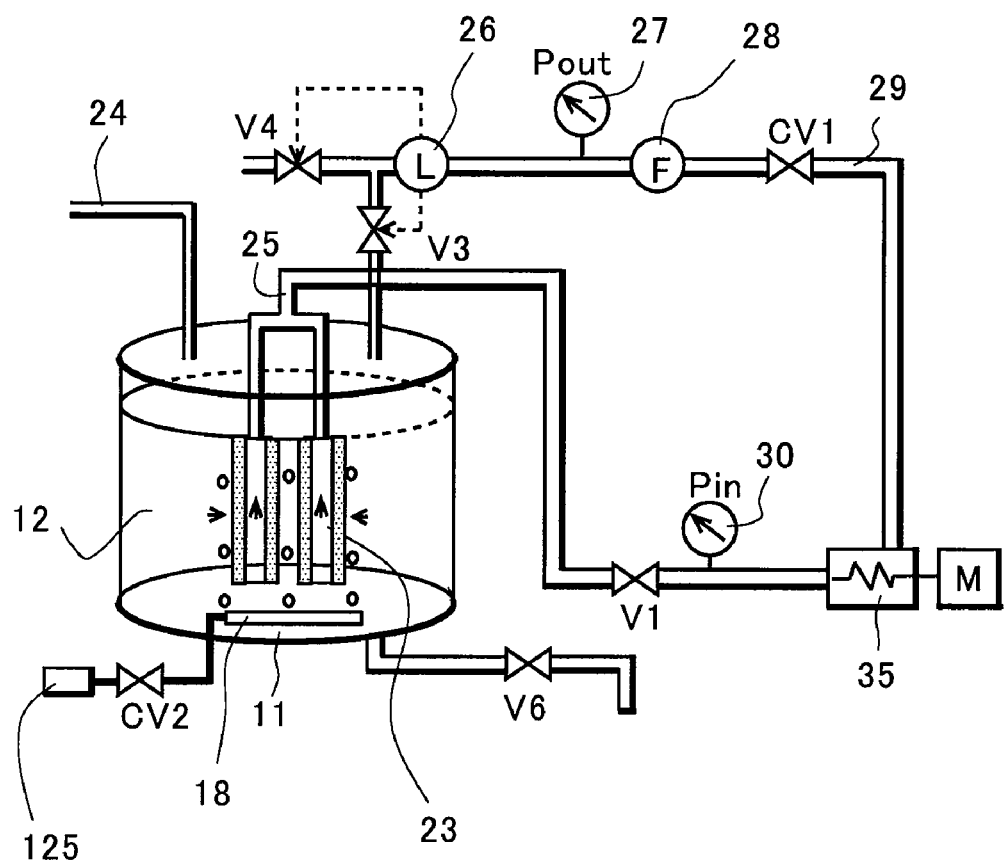
FIG. 10 is an illustration showing a specific filter apparatus according to the preferred embodiments of the invention.

Next, the description is given with reference to FIG. 10 with regard to a more specific filter apparatus.

As shown in FIG. 10, a pipe 24 is disposed at the top of a treatment tank 11 so as to act as a device for supplying water to be treated. The pipe 24 introduces into the treatment tank 11 the fluid in which the substance to be removed is mixed. In this instance, waste water containing hydrofluoric acid, which is produced by the process for manufacturing a semiconductor, is introduced into the treatment tank 11, or waste water containing calcium fluoride formed by adding calcium to the waste water mentioned above is introduced into the treatment tank 11.

A plurality of filter apparatuses 23, each of which has the second filter formed therein, are disposed in water 12 to be treated, which is stored in the treatment tank 11. A diffuser 18 is disposed at the bottom of the filter apparatus 23. For example, the diffuser 18 is configured like a pipe having small holes made therein, or like a bubbling apparatus for use in a fish tank. The diffuser 18 is precisely positioned so that bubbles therefrom pass over the surface of the filter apparatus 23. The diffuser 18 is disposed at the overall bottom of the filter apparatus 23 so as to enable a uniform supply of bubbles to the overall surface of the filter apparatus 23. Numeral 125 denotes an air pump.

A pipe 25 is fixed to the filter apparatus 23 so that a filtered fluid, after undergoing filtration by the filter apparatus 23, flows through the pipe 25. The pipe 25 is connected to a magnet pump 35 for suction via a valve V1. A pipe 29 extends from the magnet pump 35 and is connected to valves V3 and V4 via a control valve CV1. A first pressure gauge 30 is disposed beyond the valve V1 on the pipe 45 so as to measure suction pressure Pin. A flowmeter 28 and a second pressure gauge 27 are disposed beyond the control valve CV1 on the pipe 29. The flowmeter 28 controls the flow rate so as to set a given flow rate. The air flow rate of the air pump 125 is controlled by a control valve CV2.

The water 12 to be treated, which is supplied from the pipe 24, is stored in the treatment tank 11 and is filtered by the filter apparatus 23. The surface of second filter 22 mounted to the filter apparatus 23 is maintained so as to avoid a reduction in the capability of filtration. Specifically, the second filter 22 allows bubbles to pass over the surface of the filter 22, produces a parallel flow by the ascending force or burst of the bubbles, moves the substance to be removed adsorbed on the second filter 22 so as to be uniformly adsorbed on the overall surface of the filter apparatus 23.

Figure 11A:
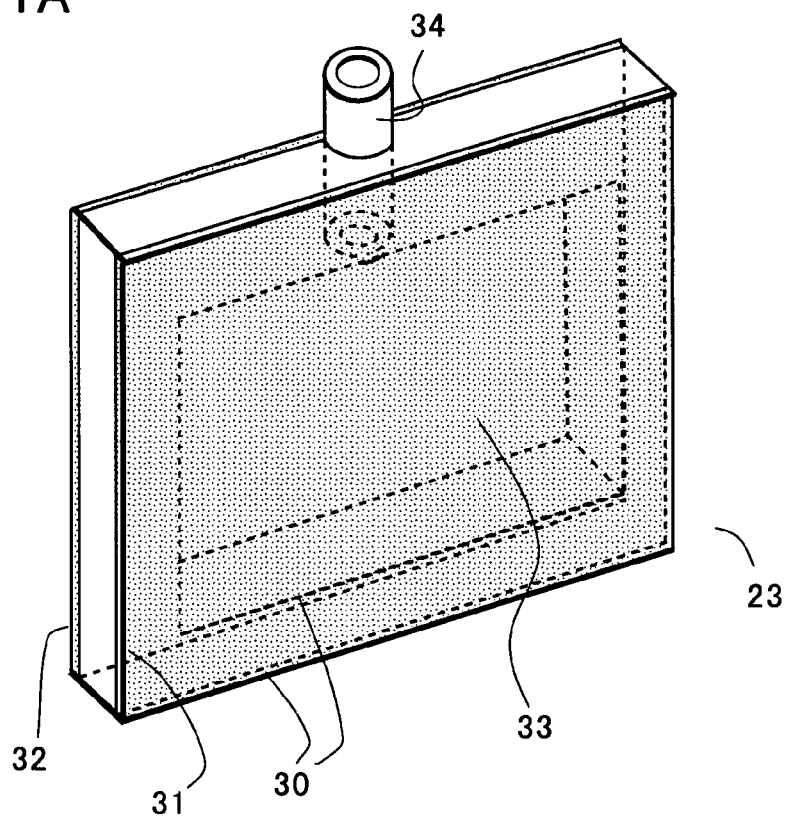
FIGS. 11A to 11C are perspective views showing the filter apparatus according to the preferred embodiments of the invention.
Figure 11C:
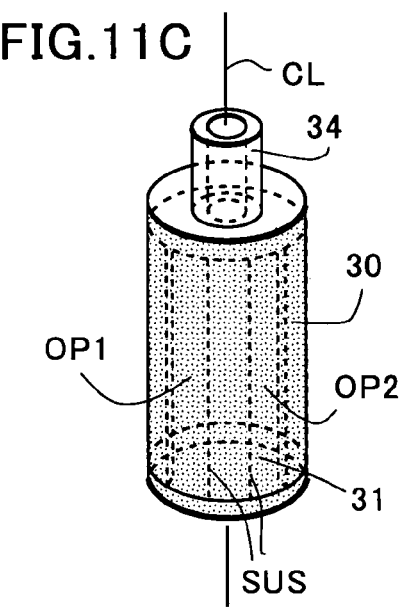
Figure 11B:
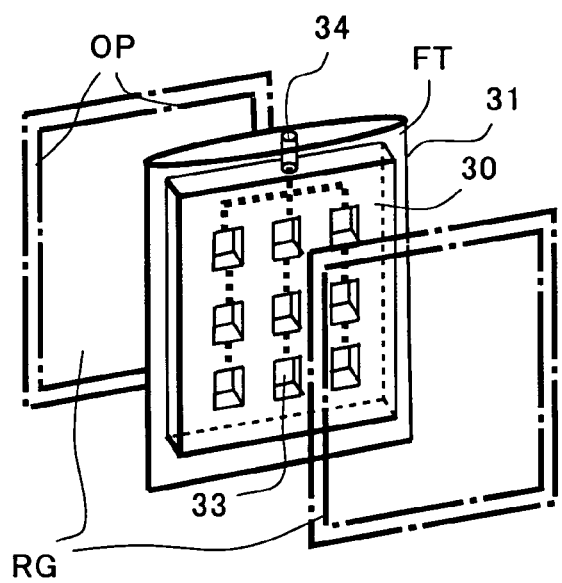

The description is now given with reference to FIGS. 11A to 11C with regard to the above-mentioned filter apparatus 23, specifically the filter apparatus 23 immersed in the treatment tank 11.

As shown in FIG. 11A, numeral 30 denotes a frame shaped like a picture frame. The frame 30 has the function of supporting the whole filter apparatus 23. Filter films 31 and 32, which form a first filter 21, are fixedly bonded to both surfaces of the frame 30. When a pipe 34 is sucked, a filtered liquid, after undergoing filtration by the filter films 31 and 32, flows into an inner space 33 surrounded by the frame 30 and the filter films 31 and 32. Then, filtered water is extracted through the pipe 34 sealed to the frame 30. The filter films 31 and 32 and the frame 30 are completely sealed so as to prevent the water to be treated from entering into the space 33 through any part other than the filter films.

The filter films 31 and 32 shown in FIG. 11A may be warped inward and broken when sucked, because the filter films 31 and 32 are each made of a thin resin film. A solution to this problem is shown in FIG. 11B. Although the number of spaces 33 is only nine in FIG. 11B, many spaces are actually formed. The filter film 31 in actual use is a polyolefine polymer film having a thickness of about 0.1 mm. As shown in FIG. 11B, a thin filter film is formed in bag-like shape and is indicated by FT. The frame 30 having the pipe 34 integrated therewith is inserted into the bag-like filter FT, and the frame 30 is bonded to the filter FT. In FIG. 11B, reference character RG denotes a holding device. The holding devices RG hold the frame bonded to the filter FT on both sides of the frame. The filter FT is exposed from an opening OP of each holding device.

FIG. 11C shows a cylindrical filter apparatus 23. A frame mounted to the pipe 34 is cylindrical in shape and has openings OP1 and OP2 on the periphery. A support device SUS for supporting the filter film 31 is disposed between the openings OP1 and OP2, because peripheral portions corresponding to the openings OP1 and OP2 are removed. The filter film 31 is bonded to the periphery of the frame.

Next, the specific description is given with regard to an actual filtration method with reference to the mechanism shown in FIG. 10. First, the water 12 to be treated is introduced into the treatment tank 11 through the pipe 24. In this instance, the substance to be removed, having fluorine content is mixed in the water 12 to be treated. Then, the filter apparatus 23, which does not have the second filter 22 but has only the first filter 21, is immersed in the treatment tank 11, and the pump 35 circulates the water to be treated by sucking the water through the pipe 25 by a slight suction pressure. A circulation path is as follows: the filter apparatus 23, the pipe 25, the valve V1, the pump 35, the pipe 29, the control valve CV1, the flowmeter 28, an optical sensor 26, and the valve V3. Thus, the water to be treated is sucked from the treatment tank 11 and is returned to the treatment tank 11.

The circulation allows the deposition of the second filter 22 on the first filter 21 of the filter apparatus 23, thus finally achieving the capture of calcium fluoride which is the substance to be removed.

Specifically, when the pump 35 sucks the water to be treated through the first filter 21 by a slight suction pressure, particles of the substance to be removed are easily solidified and adsorbed on the surface of the first filter 21. Of the solidified agglomerated particles, particles having a larger particle diameter than the pore size of the filter pore 21A of the first filter 21 are adsorbed and stacked on the surface of the first filter 21, thus yielding the second filter 22 made of the self-developing film. Incidentally, the agglomerated particles pass through the first filter 21. However, as the deposition of the second filter 22 proceeds, water in the water to be treated is sucked through the self-developing film, so that purified water is extracted. Thus, the water to be treated is filtered.

The optical sensor 26 monitors the concentration of the agglomerated particles contained in the filtered water. When the optical sensor 26 determines that the content of agglomerated particles mixed is lower than a desired content, filtration is started. When starting the filtration, the valve V3, the valve V4 and the circulation path are closed, opened and closed, respectively, in accordance with a detection signal from the optical sensor 26. Thus, purified water is extracted through the valve V4. Under control of the control valve CV2, the diffuser 18 supplies air bubbles, which are always fed from the air pump 125, to the surface of the filter apparatus 23.

When the filtration continues, the water to be treated in the treatment tank 11 is filtered to yield purified water, which is extracted from the treatment tank 11. Thus, the concentration of the substance to be removed in the water to be treated becomes higher. In other words, the water 12 to be treated is concentrated and increases in viscosity. Thus, water to be treated is added to the treatment tank 11 through the pipe 24 so as to prevent an increase in the concentration of the substance to be removed, thus increasing the efficiency of filtration. However, a thick self-developing film is deposited on the surface of the second filter 22 of the filter apparatus 23, and thus the second filter 22 soon becomes clogged. As a result, the filtration becomes impossible.

When the second filter 22 of the filter apparatus 23 becomes clogged, the restoration of the filtration capability of the second filter 22 takes place. Specifically, the pump 35 is stopped to release a negative suction pressure to the filter apparatus 23.

Figure 12A:
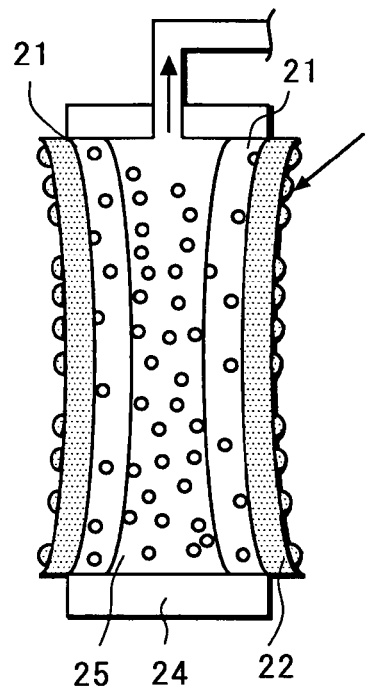
FIGS. 12A and 12B are sectional views showing the restoration of the filter apparatus according to the preferred embodiments of the invention.

A restoration process will be described in further detail with reference to schematic illustrations shown in FIGS. 12A and 12B. FIG. 12A shows the state of the filter apparatus 23 under the filtering process. Due to a slight suction pressure, the hollow of the first filter 21 is under a negative pressure as compared to the outside, and thus the first filter 21 is dented inward. Thus, the second filter 22 adsorbed on the surface of the first filter 21 is dented inward in the same manner. Moreover, the self-developing film gradually adsorbed on the surface of the second filter 22 is dented inward in the same manner.

Figure 12B:
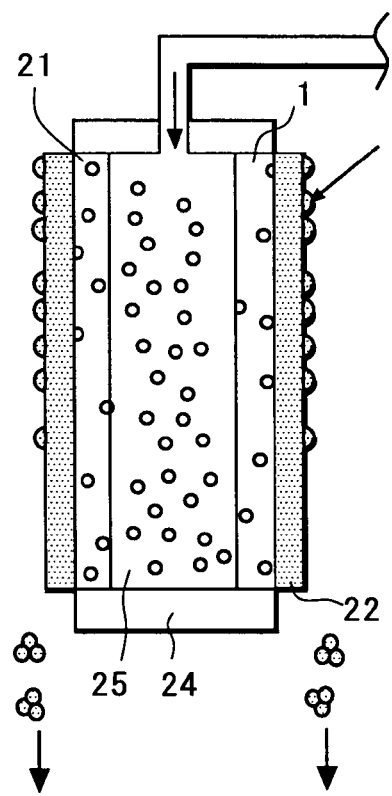

As shown in FIG. 12B, in the restoration process, the slight suction pressure is released so that the pressure in the first filter 21 is restored to nearly an atmospheric pressure. Thus, the first filter 21 of the filter apparatus 23 is restored to its original state. Thus, the second filter 22 and the self-developing film adsorbed thereon are restored to their original states in the same manner. This first leads to the absence of the suction pressure by means of which the self-developing film is adsorbed. Thus, the self-developing film loses adsorption on the filter apparatus 23 and is also subjected to outward expansion force. Thus, the adsorbed self-developing film starts peeling off from the filter apparatus 23 under its own weight. Moreover, the amount of bubbles from the diffuser 18 can be substantially doubled in order to promote the peeling. According to an experiment, from the lower end of the filter apparatus 23 first starts peeling off. Then, the self-developing film of the second filter 22 on the surface of the first filter 21 peels off just like a snowslide. Then, the self-developing film sinks to the bottom of the treatment tank 11. Thereafter, the second filter 22 can be deposited again by circulating the water to be treated via the circulation path as previously mentioned. By the restoration process, the second filter 22 is restored to its original state and is returned to a state in which the second filter 22 can filter the water to be treated. Thus, the second filter 22 performs again the filtration of the water to be treated.

In the restoration process, filtered water is allowed to flow back to the hollow 25. This assists the first filter 21 in being restored to its original state, and moreover, the hydrostatic pressure of the filtered water is applied to further apply outward expansion force. Moreover, the backflow of the filtered water promotes the peeling as given below. Specifically, the filtered water can seep from the inside of the first filter 21 through the filter pores 21A to the boundary between the first and second filters 21 and 22. Thus, the self-developing film of the second filter 22 can peel off from the surface of the first filter 21. To perform the backflow mentioned above, the filtered water 16 temporarily stored in the tank 15 shown in FIG. 2 or 3 can be allowed to flow back to the filter film.

When the filtration continues while restoring the second filter 22 as described above, the concentration of the substance to be removed in the water to be treated in the treatment tank 11 increases, and then the water to be treated also has a considerable viscosity. Thus, when the concentration of the substance to be removed in the water to be treated exceeds a predetermined concentration, the filtration is stopped, and the water to be treated is allowed to stand for precipitation. Thus, concentrated slurry is accumulated at the bottom of the treatment tank 11, and the concentrated slurry in gel form is recovered. The recovered concentrated slurry is compressed or subjected to thermodrying so that water contained in the slurry is removed, and then the resulting matter is further compressed. Moreover, the slurry can be recycled and reused as a hydrofluoric acid source.

The description is given below with regard to technical principles and concepts, except for claims, which can be understood from the above-mentioned embodiments.

Firstly, one embodiment includes recovering the calcium fluoride precipitating at the bottom of the water to be treated. This allows recovering the calcium fluoride with high efficiency.

Secondly, in another embodiment, the fluorine content is hydrofluoric acid. Therefore, hydrofluoric acid produced by the process for manufacturing a semiconductor can be treated by the apparatus or method of the preferred embodiments of the invention.

Thirdly, in still another embodiment, the calcium content is slaked lime or calcium chloride. Therefore, a combination of both the calcium contents enables the more advanced removal of the fluorine content.

Fourthly, in a further embodiment, the calcium content added to the water to be treated in the first treatment tank is slaked lime, and the calcium content added to the water to be treated in the second treatment tank is slaked lime and calcium chloride. Therefore, high-purity calcium fluoride can be recovered from the first treatment tank, and a high concentration of fluorine content can be removed from the second treatment tank.

Fifthly, in a further embodiment, the water to be treated is waste water produced by a process for processing a semiconductor. Therefore, the application of the embodiment allows efficient treatment of waste water discharged from a semiconductor factory.

What is claimed is:

1. A treatment apparatus comprising:
   a treatment tank configured to receive water comprising fluorine;
   a supplying device configured to add calcium to the treatment tank so as to form calcium fluoride in the water;
   a filter film disposed in the treatment tank and configured to filter the water so as to leave the calcium fluoride in the treatment tank, the filter film comprising a self-developed film comprising the calcium fluoride; and a storage tank configured to store temporarily filtered water from the treatment tank and placed above a water level of the treatment tank so that the stored filtered water is allowed to flow back to the treatment tank so as to peel off the self-developed film from the filter film.

2. A treatment apparatus comprising:

a first treatment tank configured to receive water comprising fluorine;

a supplying device configured to add calcium to the first treatment tank so as to form calcium fluoride in the water;

a second treatment tank configured to receive the water from the first treatment tank;

a filter film disposed in the second treatment tank and configured to filter the water so as to leave the calcium fluoride in the second treatment tank, the filter film comprising a self-developed film comprising the calcium fluoride;

a storage tank configured to store temporarily filtered water from the second treatment tank and placed above a water level of the second treatment tank so that the stored filtered water is allowed to flow back to the second treatment tank so as to peel off the self-developed film from the filter film.

3. The treatment apparatus according to claim 2, wherein the supplying device comprises a first supplying device configured to add slaked lime and a second supplying device configured to add calcium chloride.

4. The treatment apparatus according to claim 3, wherein the first and second supplying devices are disposed in the first treatment tank.

5. The treatment apparatus according to claim 3, wherein the first supplying device is disposed in the first treatment tank, the second supplying device is disposed in the second treatment tank, and another supplying device configured to add slaked lime is disposed in the second treatment tank.

* * * * *